(12) United States Patent
Zhou et al.

(10) Patent No.: US 12,259,128 B2
(45) Date of Patent: Mar. 25, 2025

(54) MULTI-STAGE FLAME ACCELERATION DEVICE AND METHOD FOR GAS-FUEL ENGINE

(71) Applicant: TIANJIN UNIVERSITY, Tianjin (CN)

(72) Inventors: Lei Zhou, Tianjin (CN); Qiang Gao, Tianjin (CN); Haiqiao Wei, Tianjin (CN); Zongkuan Liu, Tianjin (CN); Jianxiong Hua, Tianjin (CN); Gequn Shu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 154 days.

(21) Appl. No.: 17/758,247

(22) PCT Filed: Oct. 28, 2020

(86) PCT No.: PCT/CN2020/124414
§ 371 (c)(1),
(2) Date: Jun. 30, 2022

(87) PCT Pub. No.: WO2022/052238
PCT Pub. Date: Mar. 17, 2022

(65) Prior Publication Data
US 2023/0027612 A1 Jan. 26, 2023

(30) Foreign Application Priority Data
Sep. 8, 2020 (CN) .......................... 202010936966.1

(51) Int. Cl.
*F02M 21/02* (2006.01)
*F23D 14/58* (2006.01)
*F23D 14/70* (2006.01)
(52) U.S. Cl.
CPC ......... *F23D 14/70* (2013.01); *F02M 21/0275* (2013.01); *F23D 14/58* (2013.01); *F23D 2207/00* (2013.01); *F23D 2214/00* (2013.01)

(58) Field of Classification Search
CPC ...... F23D 14/70; F23D 14/58; F23D 2207/00; F23D 2214/00
(Continued)

(56) References Cited

U.S. PATENT DOCUMENTS 2,144,874 A * 1/1939 Edwards .............. F02M 61/047
239/533.9
4,499,399 A 2/1985 Flores
5,222,993 A * 6/1993 Crane .................. F02M 21/029
123/266

FOREIGN PATENT DOCUMENTS

| CN | 1453462 | 11/2003 |
| CN | 1605727 | 4/2005 |

(Continued)

OTHER PUBLICATIONS

International Search Report for PCT/CN2020/124414, dated Jun. 17, 2021, 4 pages.

*Primary Examiner* — Avinash A Savani
(74) *Attorney, Agent, or Firm* — Stanek Lemon Crouse & Meeks PA

(57) ABSTRACT

A multi-stage flame acceleration device and method for a gas-fuel engine are provided. The device includes a pressing piece, an upper chamber, a spark plug, a fuel ejector, a cooling device, and a flame acceleration nozzle. The spark plug and the fuel ejector are mounted in the upper chamber. The pressing piece is sleeved on an upper part of the upper chamber, and the device is wholly and fixedly connected to a cylinder head through a step groove of the upper chamber. A nozzle sealing ring, the flame acceleration nozzle, and a cylinder head sealing ring are mounted at a bottom of the upper chamber from top to bottom in sequence. Annular obstacles formed by annular plates are arranged in a chamber of the flame acceleration nozzle. In the method, a fuel is (Continued)

ejected in the chamber of the flame acceleration nozzle to obtain a homogeneous gas mixture.

3 Claims, 6 Drawing Sheets

(58) Field of Classification Search
USPC .................................. 431/354; 123/266, 280
See application file for complete search history.

(56) References Cited

FOREIGN PATENT DOCUMENTS

| | | |
|---|---|---|
| CN | 106870195 | 6/2017 |
| CN | 108350833 | 7/2018 |
| CN | 110173341 | 8/2019 |
| CN | 110725765 | 1/2020 |
| JP | 2017115581 | 6/2017 |
| WO | WO2011101541 | 8/2011 |

* cited by examiner

MULTI-STAGE FLAME ACCELERATION DEVICE AND METHOD FOR GAS-FUEL ENGINE

CROSS-REFERENCE TO RELATED APPLICATIONS

This patent application is a 35 U.S.C. § 371 national stage application of International Patent Application No. PCT/CN2020/124414, filed on Oct. 28, 2020, which claims the benefit and priority of Chinese Patent Application No. 202010936966.1, entitled "MULTI-STAGE FLAME ACCELERATION DEVICE AND METHOD FOR GAS-FUEL ENGINE" filed with the Chinese Patent Office on Sep. 8, 2020, the disclosures of which are incorporated by reference herein in their entirety as part of the present application.

TECHNICAL FIELD

The present disclosure belongs to the field of combustion of internal combustion engines, and particularly, relates to a multi-stage flame acceleration device and method for a gas-fuel engine.

BACKGROUND ART

With continuous intensification of the problems, such as a global greenhouse effect, pollutant emission, and energy crisis, researches on alternative fuels have attracted more and more attention. The researches on gas fuels are also very hot. At present, the gas fuels for an engine include hydrogen, natural gas, ammonia gas, etc. Compared with a conventional liquid fuel, the gas fuel is mixed with air more fully, so the particulate emission of the gas fuel is very low. In addition, the gas fuels, such as natural gas, are very rich in reserves and low in cost. The gas fuel for engine combustion not only saves the cost, but also relieves the energy pressure in China. Moreover, the gas fuels, such as the ammonia gas and the hydrogen, do not contain carbon, which achieves the real zero carbon emission. However, since the safety and the cost of the storage and the transportation of the hydrogen are very difficult to solve, there is a certain difficulty in actual mass production of engines using the hydrogen fuel. However, ammonia has been widely used in the fields of agriculture, chemical production, etc., so it has accumulated rich experience in production, storage, transportation, and supply. Further, safety guarantee measures are more perfect than those of the hydrogen. Therefore, the ammonia also has the basis for popularization and application.

However, gas-fuel engines that combusts the natural gas and the ammonia gas have the problems of low flame propagation velocity, low combustion rate, etc. Further, the ammonia gas has a high ignition point and is more difficult to be ignited. As a result, this type of gas-fuel engines is inferior to traditional engines using gasoline or diesel in terms of both power performance and economical efficiency.

However, an existing research found that the establishment of obstacles in a pipeline can realize flame acceleration to a great extent, and promote the generation of turbulence in gas flow formed by combustion. The turbulence can increase the surface area of the flame and the transfer of local mass and energy, which results in an increase of the combustion rate. So, the flame starts to accelerate subsequently. Bychokov, et al. pointed out that delayed combustion between the obstacles induces a strong jet, which drives the flame acceleration. Further, the flowing of the gas flow caused by thermal expansion of combustion products will increase the surface area of the flame. Furthermore, the increases of both the gas flow velocity and the flame velocity, as well as the increase of the surface area, can form a positive response, so as to lead to the acceleration of the flame.

SUMMARY

A purpose of the present disclosure is to provide an annular obstacle-based flame acceleration device and a flame acceleration method, so as to overcome the deficiencies in the prior art and improve the ignition stability of gas-fuel engines using such as natural gas and ammonia gas, and solve the problem of low flame propagation velocity. By means of an acceleration effect of the annular obstacles, a high-velocity jet which is rich in a large number of groups of combustion intermediate products can be ejected from a main combustion chamber of an engine, and a turbulent flame with higher intensity is formed, so as to accelerate a combustion process of such a fuel mixture.

The purpose of the present disclosure is implemented by the following technical solution.

A multi-stage flame acceleration device for a gas-fuel engine includes a pressing piece, an upper chamber, a spark plug, a fuel ejector, a cooling device, and a flame acceleration nozzle. The spark plug and the fuel ejector are mounted in the upper chamber. The pressing piece is sleeved on an upper part of the upper chamber, and the multi-stage flame acceleration device is wholly and fixedly connected to a cylinder head through a step groove of the upper chamber. A nozzle sealing ring, the flame acceleration nozzle, and a cylinder head sealing ring are mounted at a bottom of the upper chamber from top to bottom in sequence. Annular obstacles formed by multiple annular plates are arranged in a chamber of the flame acceleration nozzle. The nozzle sealing ring is configured for sealing between the upper chamber and the flame acceleration nozzle. The cylinder head sealing ring is configured for wholly sealing the multi-stage flame acceleration device and the cylinder head.

In some embodiments, the fuel ejector may eject a fuel in the chamber of the flame acceleration nozzle, and the fuel may be ignited by the spark plug to from a high-velocity flame front to propagate forward. After that, the flame and combustion intermediate products may be ejected into the main combustion chamber through multi-stage acceleration of the plurality of annular obstacles and a jet hole to accelerate the combustion rate of the main combustion chamber. The fuel in the chamber of the flame accelerating nozzle may be selected from a first fuel with high reactivity and high laminar flow flame velocity, such as hydrogen. A fuel which is the same that in the main combustion chamber may also be selected.

In some embodiments, a channel for cooling liquid is formed inside the upper chamber, and cooling liquid may be capable of flowing in from an end of the upper chamber, and flowing out from an other end of the upper chamber.

A using method of the present disclosure is as follows.

A multi-stage flame acceleration method for a gas-fuel engine includes: mixing a gas fuel and fresh air to form a fuel mixture through a jet valve of a gas inlet pipe, and opening a gas inlet valve to enable the fuel mixture enters a main combustion chamber;

ejecting and igniting the gas fuel inside the upper chamber of the multi-stage flame acceleration device, accelerating and ejecting a flame generated after the gas fuel is ignited through the annular obstacles in the flame acceleration nozzle and a jet hole to form a flame jet, igniting the fuel mixture in the main combustion chamber by the flame jet, such that stable and quick combustion in the main combustion chamber is realized.

Compared with the prior art, the beneficial effects brought by the technical solutions of the present embodiments are as follows.

1. According to the multi-stage flame acceleration device of the present disclosure, the fuel is ejected and ignited in the chamber of the flame acceleration nozzle. Multi-stage acceleration is realized in the process that the flame passes through multiple annular obstacles arranged inside the combustion device and a jet hole to achieve a higher flame propagation velocity. In this way, the purposes of igniting the fuel mixture reliably and accelerating a combustion process thereof are achieved, thereby finally realizing ultralean combustion and high-efficiency combustion.

2. A channel for cooling liquid is designed inside the multi-stage flame acceleration device, and a fuel ejector can be prevented from being damaged due to overheating by introducing the cooling liquid.

3. A single fuel or dual fuels may be selected to be injected in the engine. A low-activity fuel ignited by a high-activity fuel can be realized by adopting the dual fuel solution, so as to improve the ignition stability and the combustion rate of the low-activity fuel. The single fuel or the dual fuels may be specifically selected according to actual demands and engine parameters.

Figure 1:
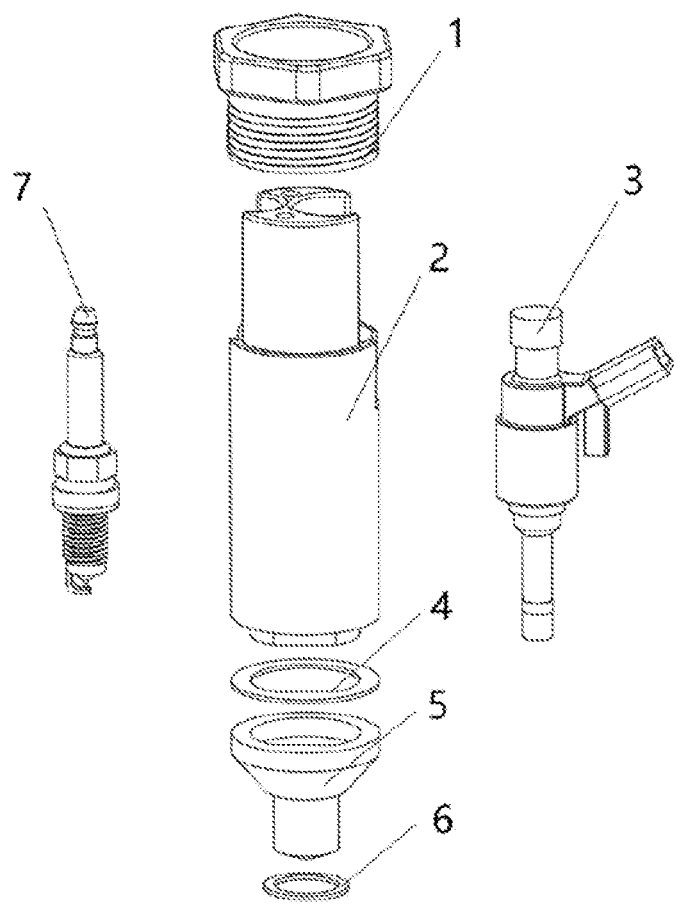
FIG. 1 is an exploded diagram of parts of a multi-stage flame acceleration device of the present disclosure.

List of the reference characters: 1 pressing piece; 2 upper chamber; 3 fuel ejector; 4 nozzle sealing ring; 5 flame acceleration nozzle; 6 cylinder head sealing ring; and 7 spark plug.

DETAILED DESCRIPTION OF THE EMBODIMENTS

The present disclosure will be further described in detail below with reference to the accompanying drawings and specific embodiments. It should be understood that the specific embodiments described herein are merely illustrative of the present disclosure and are not intended to limit the present disclosure.

FIG. 1 is an exploded view of parts of the present disclosure, which includes seven parts. According to different functions, the device may be divided into an upper part and a lower part. The upper part includes a pressing piece 1, an upper chamber 2, a fuel ejector 3, and a spark plug 7. The upper part is configured for providing a main body structure of the device, determining mounting positions of the fuel ejector 3 and the spark plug 7, and wholly fixing the device on a cylinder head.

The lower part includes a nozzle sealing ring 4, a flame acceleration nozzle 5, and a cylinder head sealing ring 6. Annular obstacles formed by annular plates are arranged in the chamber of the flame acceleration nozzle, and form a flame acceleration channel together with a jet hole. The lower part is configured for accelerating a jet flame, so as to provide a multi-point distributed and reliable ignition source for a combustion chamber of an engine. The nozzle sealing ring 4 is configured for the sealing between the upper chamber and the flame acceleration nozzle, and the cylinder head sealing ring 6 is configured for the sealing between the overall device and the cylinder head.

Figure 2:
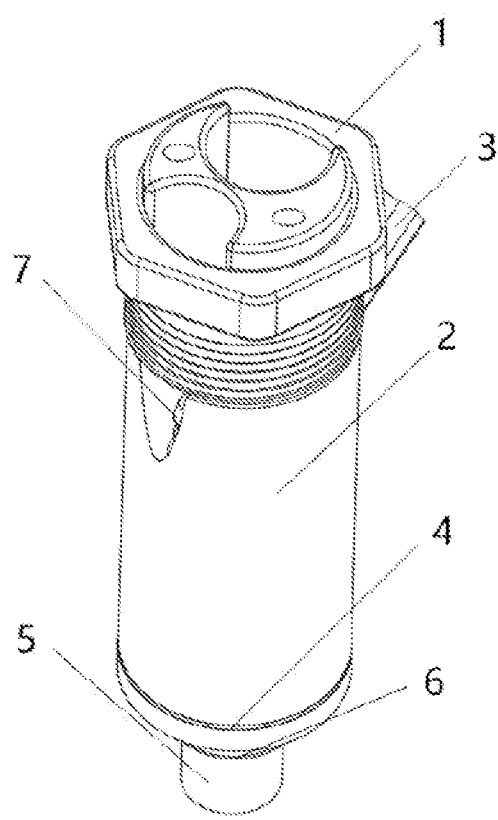
FIG. 2 is an assembly schematic diagram of the multi-stage flame acceleration device of the present disclosure.
Figure 3:
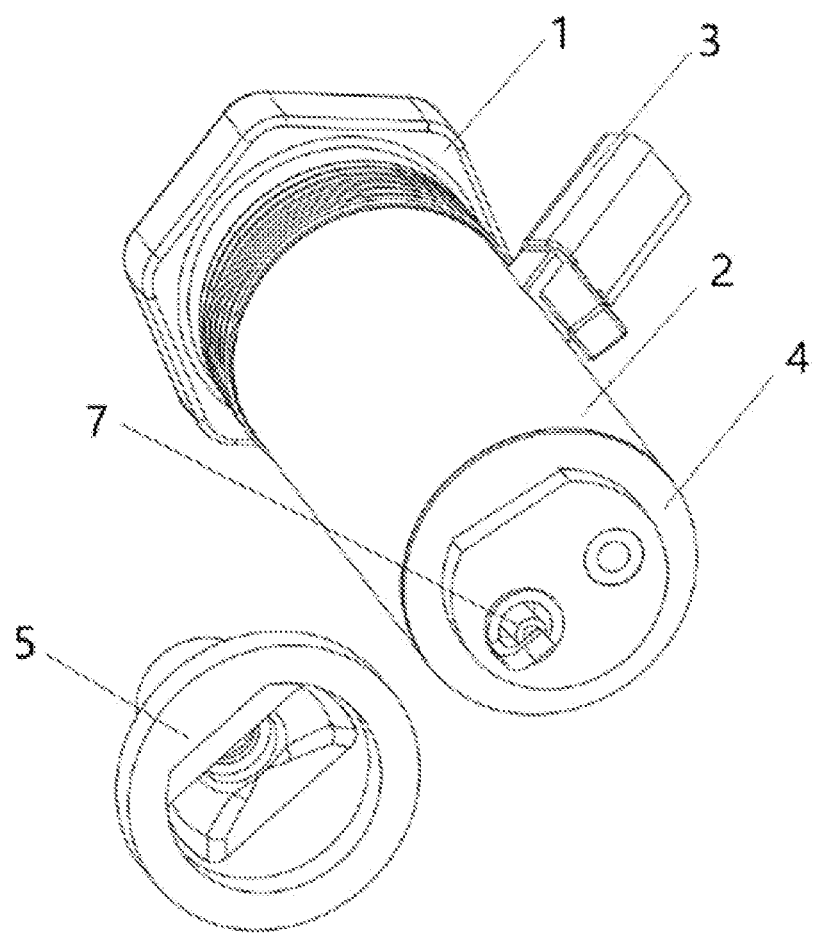
FIG. 3 shows a detailed structure of an end surface of a flame acceleration nozzle and an end surface of an upper chamber that are capable of being mated with each other.

As shown in FIG. 2, the spark plug 7 and the fuel ejector 3 are mounted in the upper chamber 2. Then, the upper chamber 2 is connected to the flame acceleration nozzle 5 below the upper chamber 2. There are corresponding notches, which are capable of being matched with each other, at the connecting positions between the upper chamber 2 and the flame acceleration nozzle 5, so as to ensure a correct matching direction therebetween. The notches are as shown in FIG. 3. The sealing between the upper chamber 2 and the flame acceleration nozzle 5 is realized by mounting the nozzle sealing ring 4 between contact end surfaces thereof.

Then, the pressing piece 1 is sleeved on the upper chamber 2. The main body of the device is pressed on the cylinder head through a step groove of the upper chamber. The pressing piece 1 is threadedly connected with the cylinder head. The overall device and the cylinder head are sealed by mounting the cylinder head sealing ring 6 between end surfaces thereof.

Figure 4:
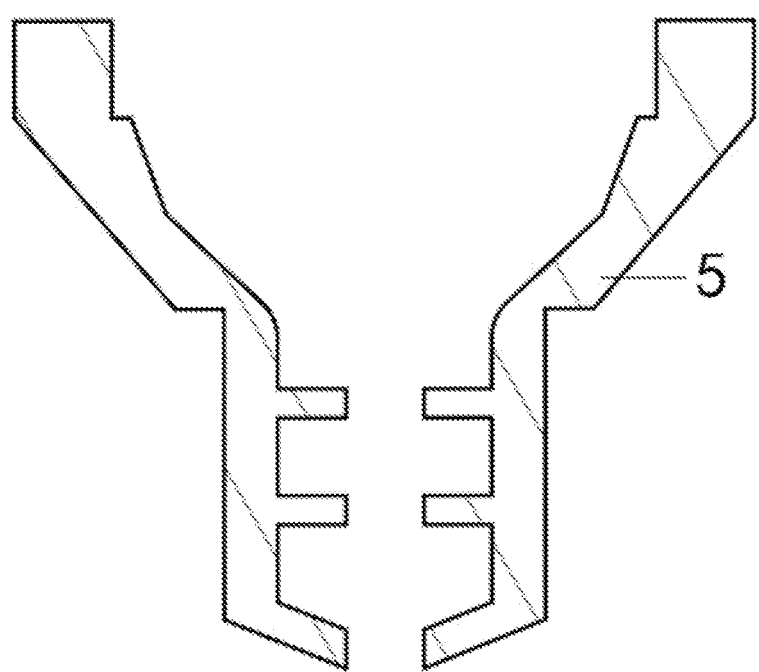
FIG. 4 is a cross-sectional view of the flame acceleration nozzle.

A structural schematic diagram of the flame acceleration device is as shown in FIG. 4, and the present embodiment adopts two-stage annular obstacles. The flame is accelerated in a stage-by-stage manner through the two-stage annular obstacles and the jet hole, and the flame jet can achieve higher propagation velocity, so as to achieve the purposes of reliably igniting a fuel mixture in the combustion chamber and accelerating a combustion process thereof.

Figure 5:
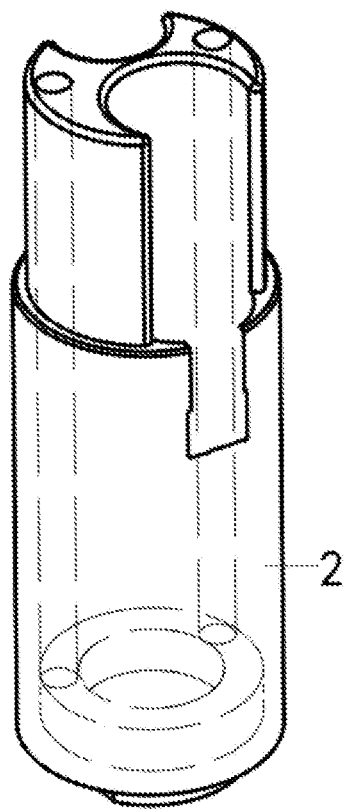
FIG. 5 is a schematic diagram of a channel for cooling liquid of the multi-stage flame acceleration device.

In order to ensure the cooling of the multi-stage flame acceleration device, a channel for cooling liquid is arranged inside the upper chamber, as shown in FIG. 5. The cooling liquid flows in from an end of the upper chamber, and flows out from an other end of the upper chamber.

A specific using method of the multi-stage flame acceleration device provided by the present disclosure includes the following steps. In step one, a gas fuel and fresh air are mixed to a fuel mixture through a jet valve of a gas inlet pipe, and a gas inlet valve is opened to enable the fuel mixture to enter into the combustion chamber. In order to obtain the fuel mixture, which is mixed fully, in the chamber inside the flame acceleration nozzle 5, and prevent the fuel mixture from flowing into the main combustion chamber, A fuel, such as hydrogen, is ejected during a compression stroke of the engine. Then, a proper ignition advance angle is selected according to different operating conditions. In step two, the gas fuel inside the upper chamber of the multi-stage flame acceleration device is ejected and ignited, and a flame generated after the gas fuel is ignited is accelerated and ejected through the annular obstacles in the flame acceleration nozzle and a jet hole to form a flame jet; and the fuel mixture in the main combustion chamber is ignited by the flame jet, such that stable and quick combustion in the main combustion chamber is realized.

Figure 6:
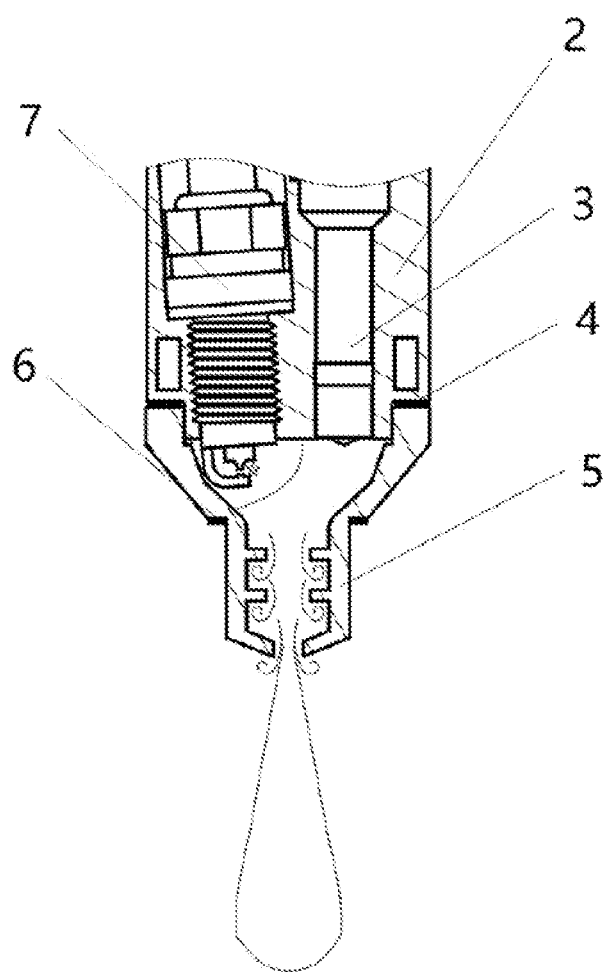
FIG. 6 is a schematic diagram of a flame acceleration principle of the multi-stage flame acceleration device.

The development of the flame inside of the multi-stage flame acceleration device is shown in FIG. 6. Firstly, the spark plug sparks to excite the formation of an initial flame kernel, and then, the flame propagates forward with a flame front close to a sphere. When the flame front develops to the annular obstacles, and through stage-by-stage acceleration of the two annular obstacles and the jet hole, a high-velocity flame jet finally enters the main combustion chamber and ignites the fuel mixture in the main combustion chamber.

The present disclosure is not limited to the implementation manner described above. The above description of the specific embodiments aims to describe and explain the technical solutions of the present disclosure. The above specific embodiments are only illustrative but not restrictive. Those of ordinary skill in the art can also make many forms of specific changes under the enlightenment of the present disclosure without departing from the scope of protection of the purpose of the present disclosure and claims, which all belong to the scope of protection of the present disclosure.

What is claimed is:

1. A multi-stage flame acceleration device for a gas-fuel engine, the multi-stage flame acceleration device comprising:
   a pressing piece, an upper chamber, a spark plug, a fuel ejector, a cooling device, and a flame acceleration nozzle, wherein the spark plug and the fuel ejector are mounted in the upper chamber;
   the pressing piece is sleeved on an upper part of the upper chamber, and the multi-stage flame acceleration device is wholly and fixedly connected to a cylinder head through a step groove of the upper chamber;
   a nozzle sealing ring, the flame acceleration nozzle, and a cylinder head sealing ring are mounted at a bottom of the upper chamber;
   annular obstacles formed by a plurality of annular plates are arranged in a chamber of the flame acceleration nozzle;
   the nozzle sealing ring is configured for sealing the upper chamber and the flame acceleration nozzle;
   the cylinder head sealing ring is configured for wholly sealing the multi-stage flame acceleration device and the cylinder head; and
   wherein the flame acceleration nozzle is configured to eject a first fuel with high reactivity and high laminar flow flame velocity to ignite a second fuel with low reactivity and low laminar flow flame velocity in a main combustion chamber.

2. The multi-stage flame acceleration device for a gas-fuel engine according to claim 1, wherein a channel for cooling liquid is formed inside the upper chamber; and the cooling liquid is capable of flowing in from an end of the upper chamber, and flowing out from an other end of the upper chamber.

3. A multi-stage flame acceleration method for a gas-fuel engine, the multi-stage flame acceleration method being carried out by the multi-stage flame acceleration device, the multi-stage flame acceleration device comprising; a pressing piece, an upper chamber, a spark plug, a fuel ejector, a cooling device, and a flame acceleration nozzle, wherein the spark plug and the fuel ejector are mounted in the upper chamber; the pressing piece is sleeved on an upper part of the upper chamber, and the multi-stage flame acceleration device is wholly and fixedly connected to a cylinder head through a step groove of the upper chamber; a nozzle sealing ring, the flame acceleration nozzle, and a cylinder head sealing ring are mounted at a bottom of the upper chamber; annular obstacles formed by a plurality of annular plates are arranged in a chamber of the flame acceleration nozzle; the nozzle sealing ring is configured for sealing the upper chamber and the flame acceleration nozzle; the cylinder head sealing ring is configured for wholly sealing the multi-stage flame acceleration device and the cylinder head; and wherein the flame acceleration nozzle is configured to eject a first fuel with high reactivity and high laminar flow flame velocity to ignite a second fuel with low reactivity and low laminar flow flame velocity in a main combustion chamber, the multi-stage flame acceleration method comprising:
   mixing a gas fuel and fresh air to form a fuel mixture through a jet valve of a gas inlet pipe, and opening a gas inlet valve to enable the fuel mixture to enter a main combustion chamber;
   ejecting and igniting the gas fuel inside the upper chamber of the multi-stage flame acceleration device, and accelerating and ejecting a flame generated after the gas fuel is ignited through the annular obstacles in the flame acceleration nozzle and a jet hole to form a flame jet; and igniting the fuel mixture in the main combustion chamber by the flame jet, such that stable and quick combustion in the main combustion chamber is realized.

* * * * *